UNITED STATES PATENT OFFICE.

HENRY A. CLARK, OF BOSTON, MASSACHUSETTS.

RUBBER CEMENT.

SPECIFICATION forming part of Letters Patent No. 389,055, dated September 4, 1888.

Application filed April 3, 1888. Serial No. 269,483. (No specimens.)

*To all whom it may concern:*

Be it known that I, HENRY A. CLARK, of Boston, in the county of Suffolk and State of Massachusetts, have invented certain new and useful Improvements in Cement, of which the following is a full, clear, and exact description.

This invention relates to a cement more particularly intended for use in securing the outer sole to the inner sole of a boot or shoe to hold the outer sole in position on the inner sole during the process of securing the outer sole to the upper and inner sole by the stitches or pegs; and the invention consists of a cement composed of the following ingredients in or about the proportions herein stated, all substantially as hereinafter fully described.

In the manufacture of this cement dissolve ten (10) ounces of balata in one-half ($\frac{1}{2}$) gallon of naphtha, and also dissolve one and one-half ($1\frac{1}{2}$) ounce of india-rubber in one-half ($\frac{1}{2}$) gallon of naphtha, and when both the balata and india-rubber are fully dissolved mix the two thoroughly together; then add to the mixture thirteen (13) ounces of resin or pitch, and stir and mix the whole thoroughly together.

It is preferable to dissolve both the balata and india-rubber under heat; also, if desirable, they can both be dissolved in the naphtha together, and before dissolving them they can be mechanically mixed together; also, if desirable, the resin or pitch can be added in a dry state, or they can be dissolved in naphtha or benzine and added in a liquid form.

When the compound is cold, it is ready for use, and in the manufacture of boots and shoes each outer sole of the boot or shoe is coated with the cement when cold on the side which will be next to the inner sole with a brush or with any suitable implement and in any desirable manner, and when the cement is dry, which will be in a few minutes, the soles so coated can be packed away ready for use.

When the boot or shoe upper is lasted to the inner sole, the outer sole so cemented is placed over any suitable heater until the cement is sufficiently warm to become "tacky" or sticky, when the sole is placed in position on the inner sole, the cement side next thereto, and pressed thereon until the cement sets and dries, which holds the outer sole in place ready to be secured to the upper and inner sole in the usual manner.

The india-rubber prevents the balata from becoming so solid as to require heat. When applying it to the sole, the balata enables the cement to be laid on the article to be cemented much smoother and more evenly than if made of india-rubber without it. It also prevents cracking of the cement when drying, and in the use of the cement having the balata as one of its elements its greater adhesive qualities yield results that are thoroughly practical and satisfactory, and such as the india-rubber without the balata does not produce, and the resin or pitch makes the cement, when warmed, after being applied to the sole, more tacky or sticky, so that it will adhere quickly to the inner sole.

This cement is of the consistency of flour paste, and can be applied with a brush or any suitable implement; also, the cement when applied to the boot or shoe sole does not require to be warmed, as it can be applied when cold, which is advantageous over cements now used for such purposes, which have to be heated before applying, which generates more or less gas from the naphtha, incurring risk of fire, &c., in their use, while the use of the present cement being applied cold obviates all such risks.

Although the cement is particularly herein stated as designed for use on boots and shoes, obviously it can be used for any purpose where a cement is desired to secure any materials together.

Any suitable resinous or pitchy substance can be used in place of the resin or pitch, but resin is preferable, or it can be dispensed with; but it is preferable to use it; also, the proportions of the several materials composing this cement can be varied more or less, and all can be mixed together in any suitable manner without departing from this invention, but substantially as herein described is satisfactory, and produces good results in practical operation.

Having thus described my invention, what I claim is—

1. A cement composed of balata, india-rubber, and naphtha, in or about the proportions stated.

2. A cement composed of balata, india-rubber, naphtha, and a resinous or pitchy substance, in or about the proportions stated.

In testimony whereof I have hereunto set my hand in the presence of two subscribing witnesses.

HENRY A. CLARK.

Witnesses:
EDWIN W. BROWN,
C. E. NICHOLS.